United States Patent [19]
Dohi et al.

[11] B 4,013,933
[45] Mar. 22, 1977

[54] NEEDLE POSITION DETECTOR FOR INDUSTRIAL TYPE SEWING MACHINES

[75] Inventors: Takashi Dohi; Kenichi Ohara; Iwao Gotoh, all of Kadoma, Japan

[73] Assignee: Matsushita Electric Industrial Co., Ltd., Japan

[22] Filed: Mar. 20, 1974

[21] Appl. No.: 452,915

[44] Published under the second Trial Voluntary Protest Program on March 30, 1976 as document No. B 452,915.

[30] Foreign Application Priority Data

Mar. 23, 1973 Japan .................. 48-33141

[52] U.S. Cl. .................. 318/467; 318/266; 112/219 A
[51] Int. Cl.² .................. G05G 5/00; H02P 3/06; D05B 69/22
[58] Field of Search .................. 318/266, 467; 112/219 A

[56] References Cited

UNITED STATES PATENTS

| | | |
|---|---|---|
| 3,187,701 | 6/1965 | Heit et al. .................. 112/219 A |
| 3,482,538 | 12/1969 | Hayashi et al. .................. 112/219 A |
| 3,532,953 | 10/1970 | Daab et al. .................. 318/467 |
| 3,573,581 | 4/1971 | Dutko et al. .................. 318/266 |
| 3,622,854 | 11/1971 | Imai et al. .................. 112/219 XA |
| 3,659,172 | 4/1972 | Kuniaki et al. .................. 318/467 |
| 3,738,297 | 6/1973 | Sangiorgi .................. 112/219 A |
| 3,757,232 | 9/1973 | Matuda .................. 318/467 X |
| 3,761,790 | 9/1973 | Daab .................. 318/467 |
| 3,763,803 | 10/1973 | Matsuda .................. 112/219 A |
| 3,804,043 | 4/1974 | Benson et al. .................. 112/219 A |

Primary Examiner—G. Z. Rubinson
Assistant Examiner—John J. Feldhaus
Attorney, Agent, or Firm—Robert E. Burns; Emmanuel J. Lobato; Bruce L. Adams

[57] ABSTRACT

A rotating disc driven in synchronism with the reciprocating movement of the needle of a sewing machine has a plurality of cutaway arc-shaped sections having different arcs to produce a pulse train of frequency related to the motor speed. A photoelectrical device responds to intermittent light the interceptions being caused by the rotating disc. The pulse train comprises pulses of different pulse lengths, each corresponding to the lower and upper dead points of the needle. First and second pulse length detectors are provided to detect sequentially each of the pulse lengths in a controlled manner by the operator manipulation of a treadle so that the motor is decelerated from a preselected speed to a standstill with the needle at its lower or upper dead point.

9 Claims, 12 Drawing Figures

NEEDLE POSITION DETECTOR FOR INDUSTRIAL TYPE SEWING MACHINES

The present invention relates to an electronic control arrangement for positioning the needle at a dead point for facilitating thread trimming and other operations of a sewing machine of the industrial type.

In sewing machines of the industrial type there are normally at least two manually operated controls. One control consists of a treadle which controls the sewing machine at high speeds for normal sewing operations. The operator must be able to stop the machine momentarily, and with precision, for example to rotate the material to resume sewing in a new direction. For this purpose it is necessary for the needle to come to rest at its lower dead point when the machine stops so that the needle remains on the same seam to facilitate the movement of the material around the needle. To obtain such precision stopping and positioning of the needle, the sewing machine is decelerated to a low speed, normally 400 r.p.m., considerably lower than the normal high speed of operation. The sewing machine of the industrial type is also provided with a stop control capable of stopping the needle at its upper dead point in which the needle is out of engagement with the material.

Prior electronic control arrangements for positioning the needle at its lower and upper dead points are not satisfactory in that they have been complicated and expensive.

It is an object of the present invention to provide an improved electronic control arrangement for detecting the needle-up and needle-down positions for a sewing machine of the industrial type, which control arrangement is simple in construction and economical.

In accordance with the present invention there is provided an electronic detector for a sewing machine of the industrial type having a motor drivable at a predetermined speed, or at high and low speeds, a needle, and a needle armshaft adapted to be driven by the motor to cause the needle to move reciprocally. The present invention is characterized by means for producing a pulse train in synchronism with the reciprocating movement of the needle when the motor is driven at a preselected speed, the pulse train including a pulse of a first length occurring at the instant substantially corresponding to the lower dead point of the needle and a pulse of a second length occurring at the instant substantially corresponding to the upper dead point of the needle. The invention is further characterized by first pulse length detecting means which is operable when the motor is driven at the preselected speed for detecting the first pulse length to decelerate the motor to a standstill with the needle at its lower dead point and second pulse length detecting means which is operable after the first pulse length has been detected for detecting the second pulse length while the motor is again driven at the preselected speed so that the motor is decelerated to a standstill with the needle at its upper dead point.

In accordance with another embodiment of the invention there is provided an electronic detector for a sewing machine of the industrial type having a motor drivable at a predetermined speed, or at high and low speeds, a needle, and a needle armshaft adapted to be driven by the motor to cause the needle to move reciprocally. The invention is characterized by means for producing a pulse of a predetermined length in synchronism with the reciprocating movement of the needle with the extreme edges of the pulse each corresponding to the lower and upper dead points of the needle, first pulse edge detecting means for detecting one of the extreme edges of the pulse when the motor is driven at a preselected speed to decelerate the motor to a standstill with needle at the lower dead point and second pulse edge detecting means operable after the one of the edges has been detected for detecting the other of the extreme edges of the pulse while the motor is driven again at the preselected speed to decelerate the motor to a standstill with the needle at the upper dead point.

A preferred embodiment of the invention will now be described with reference to the accompanying drawings, in which.

Figure 1:
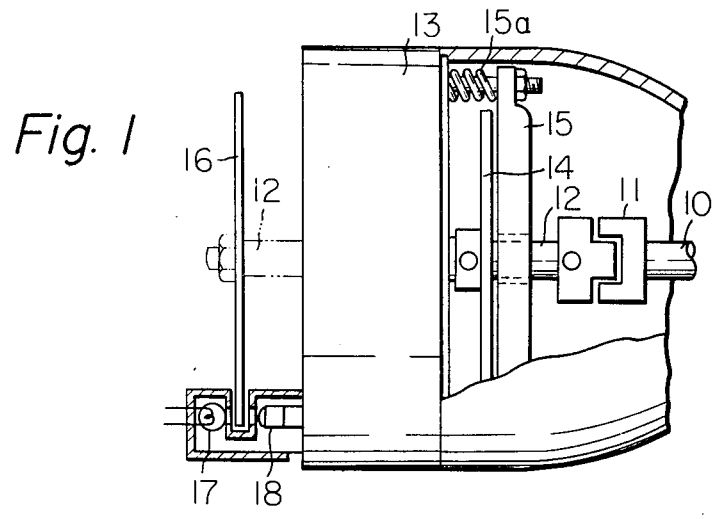
FIG. 1 is a fragmentary elevational view showing the relation between the driving motor, the needle armshaft and a speed and position sensing disc used in a system of the invention.
Figure 2:
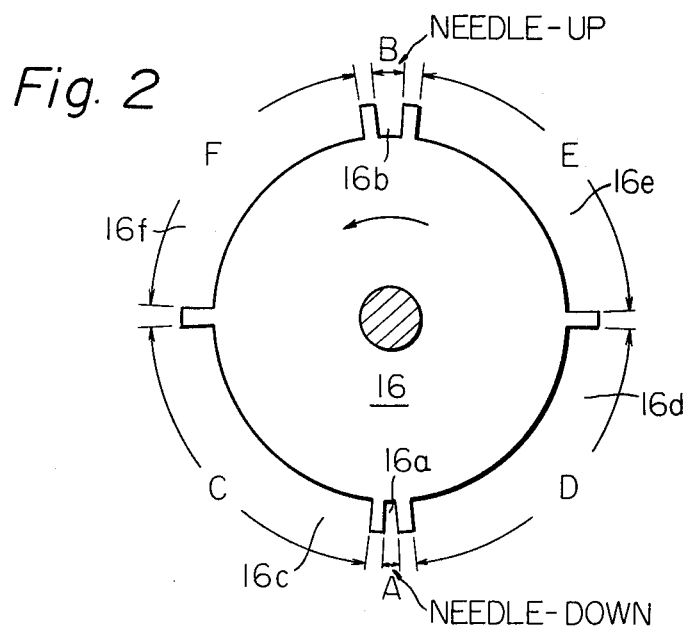
FIG. 2 is a view in elevation of the speed and position sensing disc shown in FIG. 1.

Referring now to FIG. 1, a needle armshaft 10 of a sewing machine of the industrial type is coupled by means of a joint 11 to a drive shaft 12 of a driving motor 13 capable of running at a high speed normally of the order of thousands of revolutions per minute for normal sewing operations and at an auxiliary low speed which is normally 400 r.p.m. for position sensing operations. Numeral 14 designates a magnetized disc coaxially coupled to the drive shaft 12 of the motor and 15 a disc brake consisting of an electromagnetic coil wound about the axis of the drive shaft 12 and resiliently supported to the housing of motor 13 by a spring 15a and slidably axially movable toward and away from the magnetized disc 14, so that upon application of a brake current through the winding coil of the brake disc the magnetized disc and brake disc are brought into frictional contact with each other to apply a braking force to the armature of the motor. The drive shaft 12 extends at the opposite end to carry a speed and position sensing disc 16 which will be described with reference to FIG. 2 for unitary rotation therewith. A light source 17 and a photoelectrical device which, in the present invention, may be a phototransistor 18 are arranged in opposed relation with the disc 16 being interposed therebetween. The speed and position sensing disc has at its periphery a plurality of cutaway portions to allow passage of a beam of light for intermittently illuminating the phototransistor 18 to produce a pulse train. The cutaway portions include a portion 16a having an arc A which is so located as to intercept the light emitted from the light source 17 when the needle (not shown) is at its lower dead point and a cutaway portion 16b which is preferably located at a position of the periphery in diametrically opposed relation to the portion 16a. The portion 16b has an arc B which is greater than the arc A. The disc 16 has preferably a plurality of cutaway portions 16c, 16d, 16e and 16f of equal arc which is greater than arc B. It is to be noted the number of the cutaway portions of equal arc is not limited to the number as disclosed in the drawings, the number being any number in so far as the equal arc is greater than arc B. The cutaway portion 16c which comes next to portion 16a as the disc rotates in a direction as indicated by the arrow in FIG. 2 defines a portion in which the needle must be held at rest for thread operations such as thread tension release, thread trimming and thread wiping.

Figure 3:
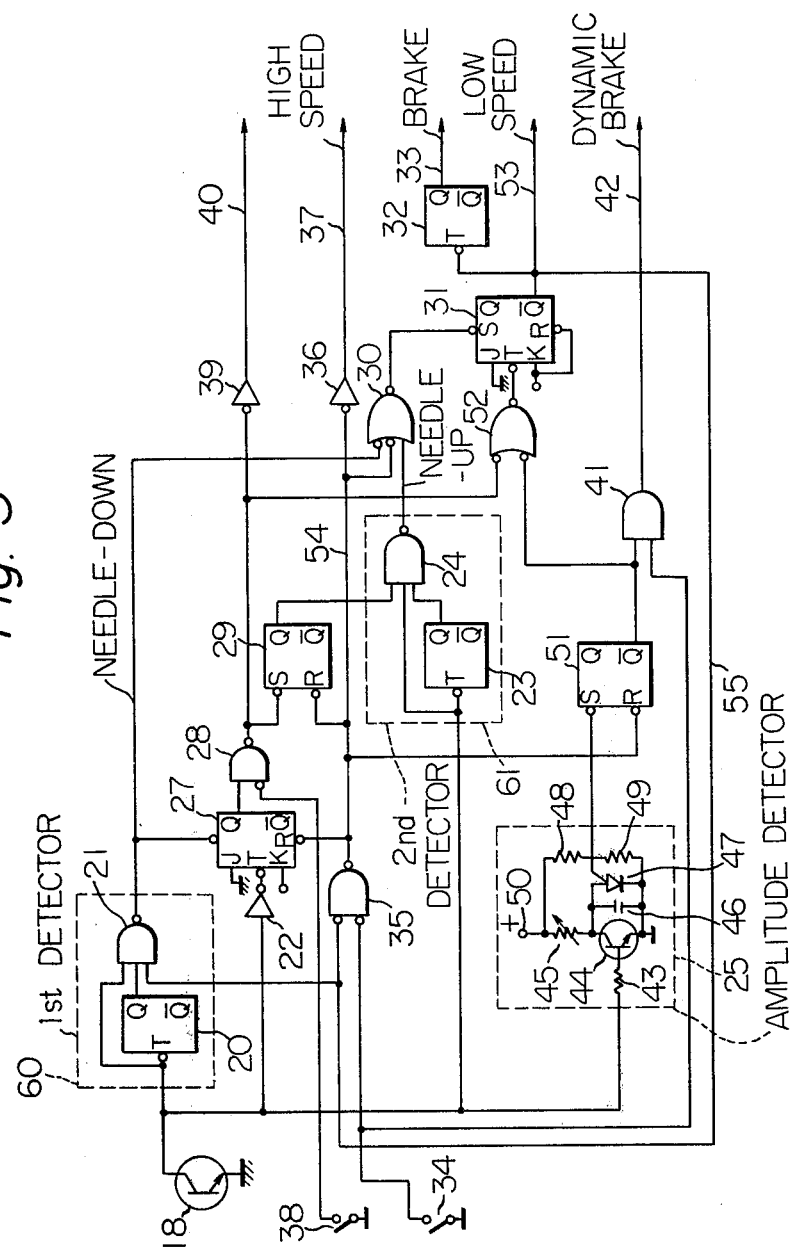
FIG. 3 is a schematic circuit diagram of the motor speed and needle position detecting system of the invention.

In FIG. 3 there is shown a circuit diagram which provides for high speed running, low speed running and stopping of a sewing machine by operator manipulation of a treadle. The phototransistor 18 receives light from the light source 17 and produces a pulse train as the disc 16 rotates interrupting the light beam, and feeds the pulse train to a first pulse detector 60 including a needle-down monostable multivibrator 20 and a needle-down AND gate 21, a second pulse detector 61 including a needle-up monostable multivibrator 23 and a needle-up AND gate 24, and to other circuits including an error indicating NOT circuit 22, and an amplitude detector 25. The output 26 of AND gate 21 is coupled to the set terminal of a needle-down indicating flip-flop 27, the output thereof being coupled to a needle-up AND gate 28 which couples to a flip-flop 29 which applies a needle-up command signal to the needle-up AND gate 24. The flip-flop 27, needle-up AND gate 28 and flip-flop 29 constitute a memory circuit. The output of the AND gate 21 also couples to an OR gate 30 which passes a needle-down command signal to the set terminal of a brake and low-speed flip-flop 31. A brake monostable multivibrator 32 is coupled to the Q output of the flip-flop 31 to apply a brake pulse on lead 33 to the brake disc 15. A normally open contact 34 which is operable upon actuation of a treadle (not shown) by the operator is coupled to ground and a high-speed AND gate 35 the output of which is coupled to the reset terminal of the flip-flop 29 and an NOT circuit 36 which inverts the signal from the low level to a high level signal which on lead 37 is applied to the driving motor 13 to drive it at a high speed for normal sewing. A normally open contact 38 which is also operable upon actuation of the treadle in an opposite direction couples to the input circuit of the AND gate 28 for needle-up positioning operation. The output of the AND gate 28 is coupled to an NOT circuit 39 which inverts the low level signal to a high level signal and applies it on lead 40 to the associated apparatus which performs thread tension releasing, thread trimming and thread wiping operations. A dynamic brake AND gate 41 has its input coupled to the needle-down control switch 34 and applies a dynamic brake signal on lead 42 to the armature of the motor 13. The amplitude detector 25 comprises an input resistor 43, a transistor 44, an RC circuit including a variable resistor 45 and a capacitor 46, a thyristor 47 and series-connected resistors 48 and 49 of a voltage divider. The input resistor 43 couples the input pulse train from the phototransistor 18 to the base of the transistor 44. The variable resistor 45 is connected to the collector of transistor 44 and the capacitor 46 is coupled to the resistor 44 and ground. The series-connected resistors 48 and 49 provide a reference voltage at the junction thereof which is compared with the potential across the capacitor 46 by means of the two input electrodes of the thyristor 47. When the potential across the capacitor reaches the reference voltage the thyristor is caused to conduct and provides a low level signal to the set terminal of a flip-flop 51. A positive terminal 50 receives positive voltage from a power source (not shown). The flip-flop 51 has its output coupled to the dynamic brake AND gate and to the trigger input of the low-speed flip-flop 31 through an OR gate 52. A low-speed signal is applied on lead 53 to the motor 13 to drive it at 400 r.p.m.

Upon energization of the circuit of FIG. 3, the flip-flops 27, 29 and 51 are placed under the reset condition by a reset pulse supplied from a circuit (not shown) so that the Q outputs of these flip-flops are brought to a high potential level with their complementary Q outputs at a low potential level. Consequently, the flip-flop 31 changes its state by application of a set pulse on lead 54 through OR gate 30 with the Q output at a low level. Therefore, no signals are applied on any output leads 40, 37, 33, 53 and 42 at this moment and the sewing machine is not operative under this condition.

Upon actuation of the treadle to move in the forward direction by the operator, the normally open contact 34 is closed and applies a low level signal to the high-speed AND gate 35 to which is also applied a low level signal from the Q output of flip-flop 31. The AND gate 35 applies a low level signal on lead 54 to NOT circuit 36 which applies a high speed signal to the motor to drive at the predetermined high speed for normal sewing. Upon relaxation of the treadle, the contact 34 is open and the high speed signal is removed from lead 37. With the contact 34 being out of circuit, a high level signal is applied to the dynamic brake AND gate 41 which passes the high level output on lead 42 to the armature of the motor to decelerate the motor with the armature working as a load.

As previously described, the phototransistor 18 produces a pulse train of frequency related to the motor speed due to interruption of disc 16 of the light beam provided by the light source 17. The pulse train comprises a first pair of pulses occuring at the instant the cutaway portion 16a of disc 16 traverses the light beam in exact synchronism with the needle-down position and a second pair of pulses occurring at the instant the cutaway portion 16b traverses the light beam in synchronism with the needle-up position. The first pair of pulses is spaced apart at a first predetermined pulseless period and the second pair of pulses is spaced apart at a second predetermined pulseless period greater than the first pulseless period. The pulse train may further comprise additional pulses each occurring at the instant equally spaced from the first and second pairs of pulses in correspondence to offset portions 16a, 16d, 16e and 16f, the pulseless period thereof being greater than the second pulseless period of the second pair of pulses.

The transistor 44 of amplitude detector 25, which is normally in conducting state, changes its state to nonconducting by the pulse train which is at low level. The nonconducting period of the transistor 43 is dependent on the frequency of the pulse train during which the voltage across the capacitor 46 rises exponentially and drops to zero by the subsequent pulse. The maximum voltage across the capacitor 46 thus increases with the decrease in the frequency of the pulse train. As the motor approaches a speed slightly above the low positioning speed of 400 r.p.m., the voltage across the capacitor 46, increases and hence, the input voltage at one input electrode of the thyristor 47 approaches the reference voltage provided by the series connected resistors 48 and 49. The thyristor 47 fires and provides a short circuit across the resistor 49. A low output is thus applied to the set input of flip-flop 51 and the Q output thereof goes low resulting in the AND gate 41 removing the dynamic brake signal from lead 42. Simultaneously, the low output of the Q output of flip-flop 51 is applied to the trigger input of the low speed flip-flop 31 (which has been under the set condition) through OR gate 52 and changes it from the first state to the second state. The Q output of flip-flop 31 goes high and a low-speed signal is applied on lead 53 to the motor 13 to run at the low positioning speed of 400 r.p.m. With the Q output of flip-flop 31 at a high level, the high output is applied on lead 55 to the low position AND gate 21 preparatory for needle-down positioning operation.

Figure 4:
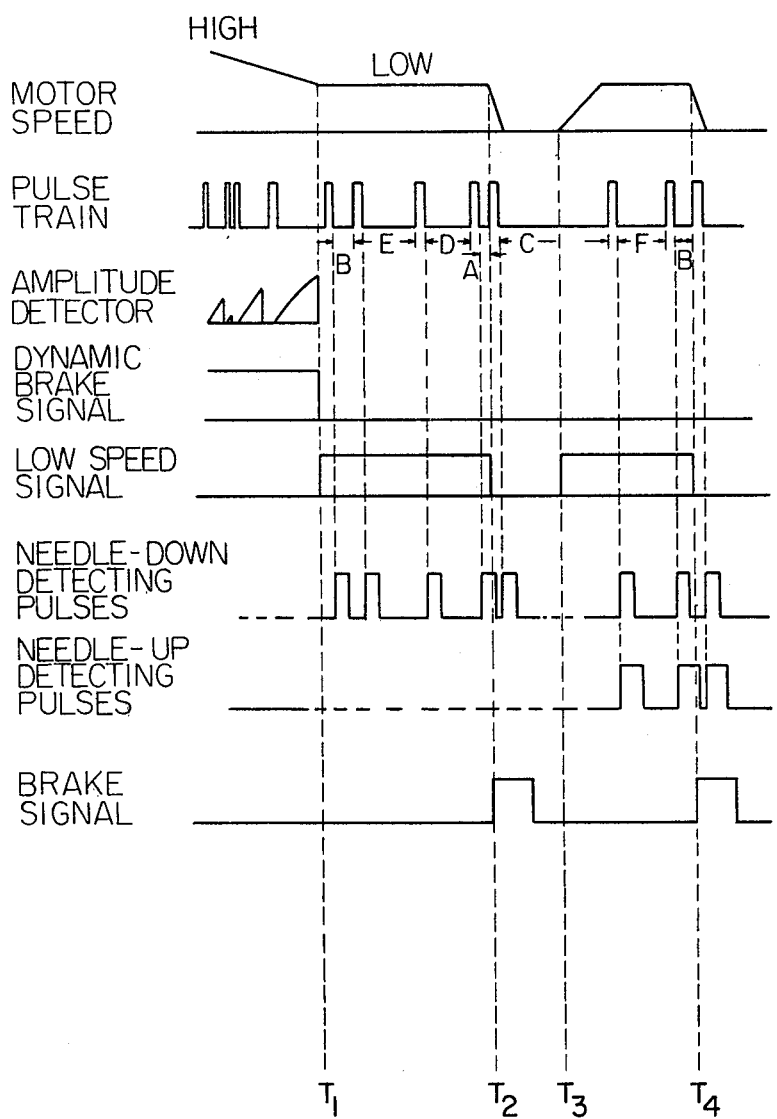
FIG. 4 is a graphical representation of the timerelated waveforms and operating conditions of the circuit elements used in the circuit of FIG. 3.

From the instant $T_1$ in FIG. 4 the motor runs at low positioning speed and with one of the three inputs of the needle-down position AND gate 21 being at a high level, the needle-down position monostable multivibrator 20 produces a single pulse at the trailing edge of the applied pulse, the output pulse having a pulse duration or width greater than the first pulseless period of the first pair of pulses and smaller than the second pulseless period of the second pair of pulses. Therefore, a coincidence occurs at $T_2$ of FIG. 4 in the AND gate 21 at the leading edge of the subsequent pulse of the first pair of pulses. A first pair of pulses is thus detected and a low level output is applied on lead 26 to the set input of flip-flop 31 by way of OR gate 30 and changes it from the second reset condition to the first set condition to remove the low positioning speed signal from lead 53. At the instant the lead 53 is brought to a low level, a single pulse is produced at the Q output of the monostable multivibrator 32 to apply a brake signal on lead 33 to the disc brake 15. The disc brake is magnetically attracted to the adjacent disc 14 abutting it to decelerate the motor to a standstill with the needle at the lower dead point. Under this condition, the speed and positioning disc 16 is positioned so that the light beam of light source 17 lies within the cutaway portion 16c, and the flip-flop 27 remains in the set condition which differentiates it from the condition prior to actuating the treadle for high speed sewing, indicating that needle-down position has been detected. The flip-flop 27 with its trigger input connected to the phototransistor 18 ensures that the light beam passes through the cutaway portion 16c. If the disc 16 has rotated by an amount such that the light beam passes through the cutaway portion 16f, a low level pulse will be produced by the phototransistor 18 and inverted by the NOT circuit 22 to trigger the flip-flop 27 to the reset condition to inhibit the subsequent needle-up positioning operation.

Upon actuation of the treadle in the rearward direction at $T_3$ by the operator to close the normally open contact 38 for needle-up positioning, a low level input is applied to the AND gate 28 producing a low level output which is inverted by the NOT circuit 39 into a high level output signal on lead 40 to be applied to the associated thread operation apparatus (now shown) for actuating thread tension releasing, thread trimming and thread wiping operations. The low level output from the AND gate 28 triggers flip-flop 31 by way of OR gate 52 into the reset condition to drive the motor at the low positioning speed and changes the flip-flop 29 from the reset to set condition with the Q output at high level which is applied to the needle-up position AND gate 24. With the motor driven at the low speed and at the next half cycle of rotation, the cutaway portion 16b traverses the light beam and a second pair of pulses as previously described is produced by the phototransistor 18. The needle-up position monostable multivibrator 23 produces in response thereto a pulse at the trailing edge of the preceding pulse of the second pair of pulses. It is noted, however, that the pulse so produced has a duration greater than the second pulseless period of the second pair of pulses. Thus, coincidence occurs at time $T_4$ in the AND gate 24 at the leading edge of the subsequent pulse of the second pair of pulses and triggers the low-speed flip-flop 31 to the set condition, thus causing the Q output to go low. As described above, a brake pulse is produced by the monostable multivibrator 32 at the instant the Q output goes low and the motor is decelerated to a standstill with the needle at its upper dead point.

Figure 5:
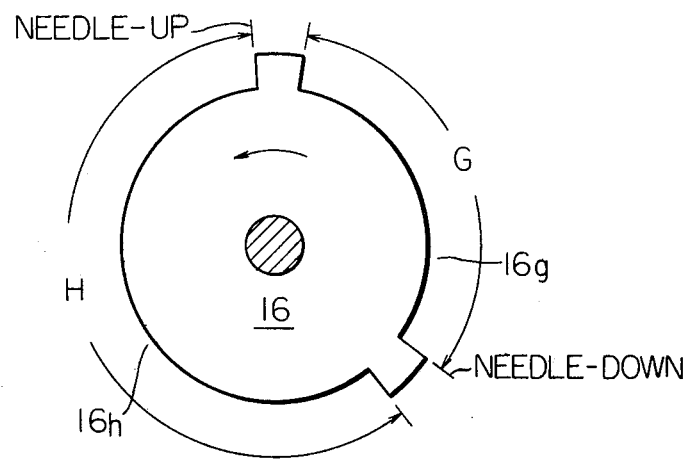
FIG. 5 is a view in elevation of a modified form of the speed and position sensing disc.
Figure 6:
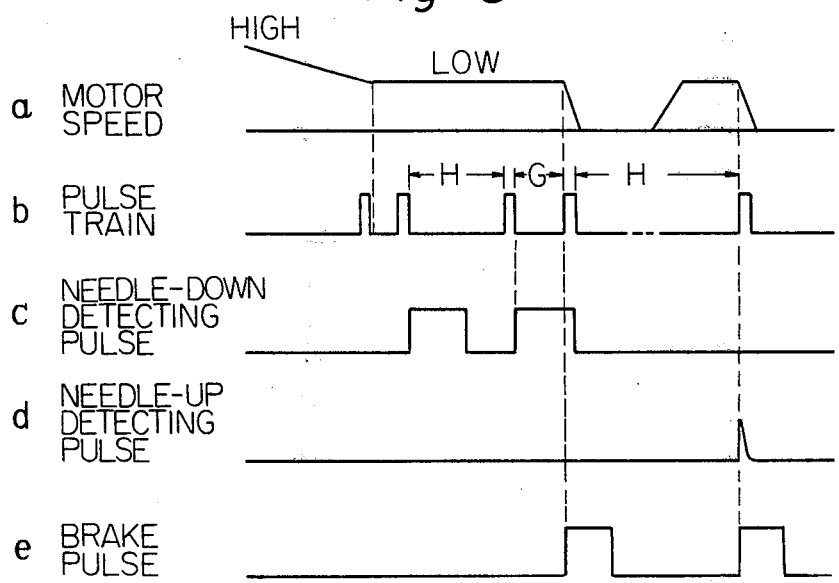
FIG. 6 is a graphical representation of the timerelated waveforms and operating conditions of the circuit elements used in the circuit of FIG. 7.
Figure 7:
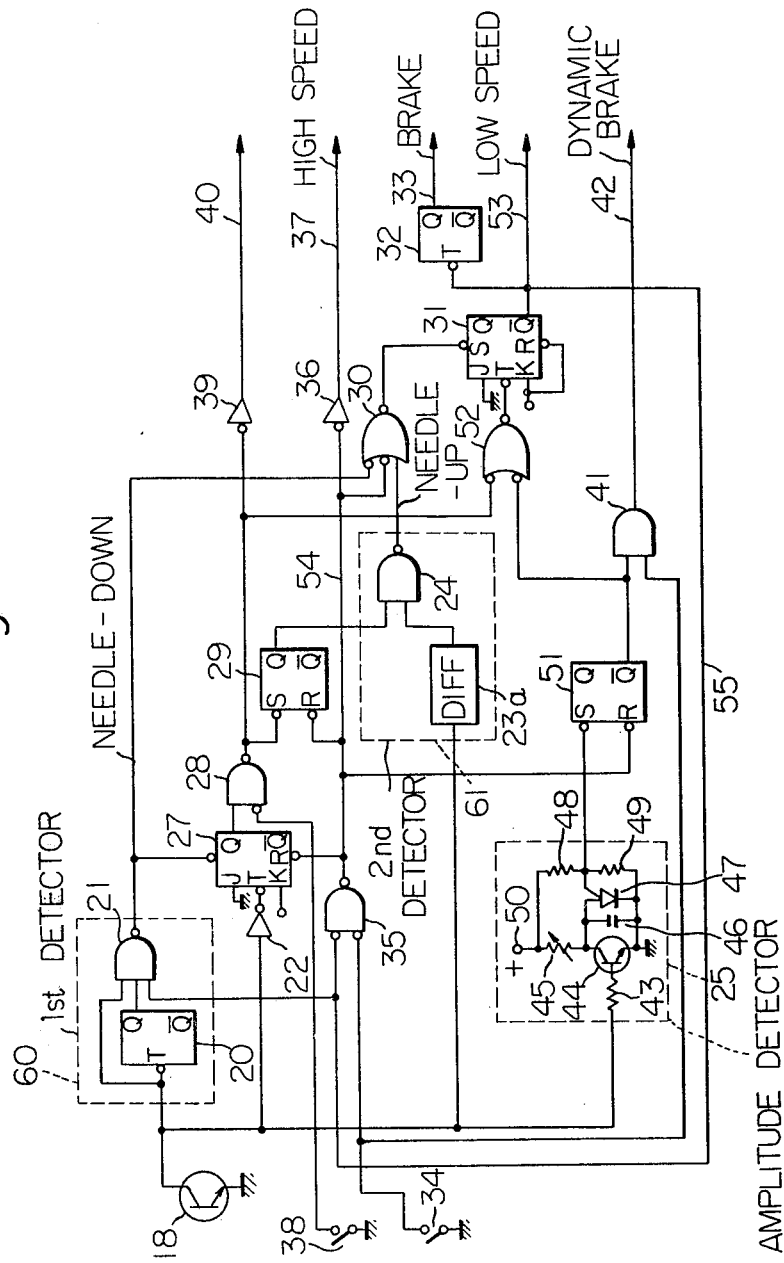
FIG. 7 is a schematic circuit diagram of the system of the invention used in conjunction with the disc of FIG. 5.

A modified form of the preferred embodiment of the invention is shown in FIGS. 5 to 7. In FIG. 5 the position sensing disc 16 has its outer periphery a cutaway section 16g having an arc G and a cutaway section 16h having an arc H which is greater than arc G. As the disc 16 rotates in the direction of arrow, a pulse train consisting of needle-up and needle-down positioning pulses is produced at the phototransistor 18 as illustrated in FIG. 6b with pulseless period G and pulseless period H greater than the period G, each corresponding to cutaway sections 16g and 16h. The pulse train is applied to the first pulse detector 60 (FIG. 7) of the same circuit as employed in the previous embodiment, the circuit of FIG. 7 being the same as FIG. 6 except for the 2nd detector 61. The needle-down monostable multivibrator 20 produces in response to the applied pulse a needle-down detecting pulse of a duration greater than the pulseless period G but smaller than the pulseless period H. In the low positioning speed period, the needle-down AND gate 21 produces a coincidence output when the needle-down detecting pulse coincides with needle-down positioning pulse applied thereto, but will produce no output during the pulseless period H. A brake signal will be produced in the same manner as previously described to cause the motor to decelerate to a standstill with the needle at its lower dead point. During the next low positioning speed period, the second pulse detector 61 will be brought into circuit. The detector 61 comprises in this case a differentiator 23a coupled to the phototransistor 18 and the needle-up AND gate 24 having its one input coupled to the output of differentiator 23a. Upon receipt of the needle-up positioning pulse from the phototransistor, the differentiator 23a produces at the leading edge of the applied pulse a needle-up detecting pulse (in FIG. 6d). With the AND gate 24 having the other input energized by the high Q output of the flip-flop 29, the low-speed flip-flop 31 changes its state to cause its Q output to go low resulting in the brake signal monostable multivibrator 32 producing an output (FIG. 6e) which causes the motor to stop with the needle at its upper dead point.

Figure 8:
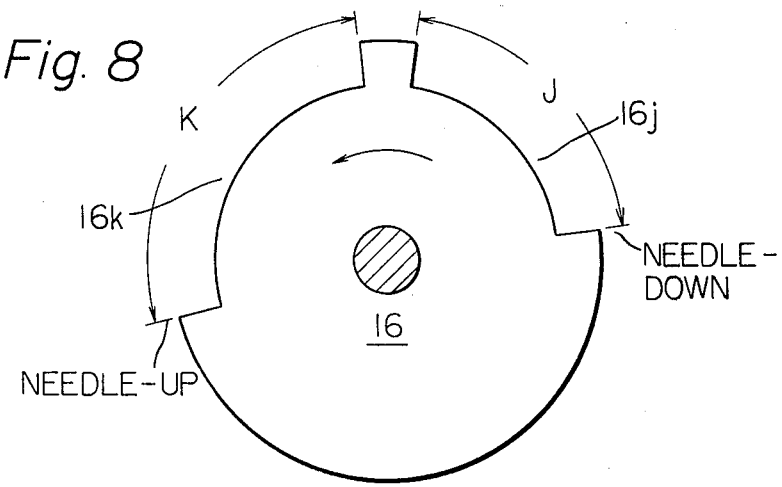
FIG. 8 is a view in elevation of another modified form of the disc.
Figure 9:
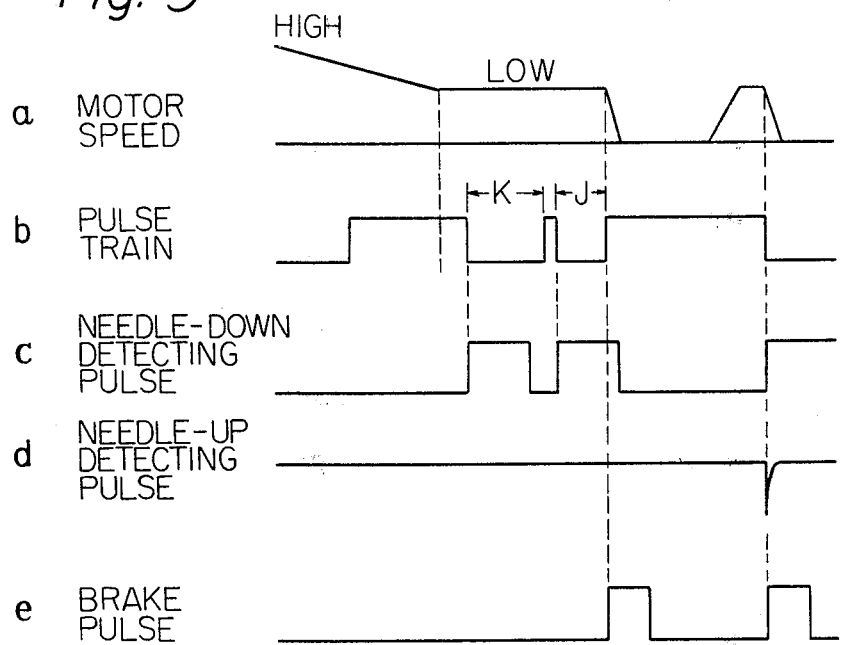
FIG. 9 is a graphical representation of the timerelated waveforms and operating conditions of the circuit elements used in the circuit of FIG. 7 used in conjunction with the disc of FIG. 8.

In FIG. 8, a modified form of the disc 16 is shown and comprises a cutaway section 16j which defines an arc J and a cutaway section 16k defining an arc K which is greater than the arc J. A pulse train produced at the phototransistor 18 is as shown in FIG. 9b and applied to the first detector 60 of FIG. 7. The monostable multivibrator of the detector 60 is designed to produce in this case a needle-down detecting pulse with a length greater than the pulseless period J but smaller than the pulseless period K. In the low speed period for positioning the needle at the lower dead point, the pulseless period J corresponding the arc J is detected by the first detector 60 to cause the flip-flop 32 to produce a brake signal on lead 33. In the next low speed period for positioning the needle at the upper dead point, the falling edge of the next pulse is detected by the second pulse detector 61 of FIG. 7 which may comprise differentiator 23a and AND gate 24. It is seen that the falling edge of the pulse may be detected by a monostable multivibrator as the monostable multivibrators 20 and 23 produce a pulse at the falling edge of an applied pulse and therefore the circuit of FIG. 3 may be employed for detecting the pulse train of FIG. 9b. Thus, the second detector 61 may be of any circuit which detects variation in amplitude of the applied pulse.

Figure 10:
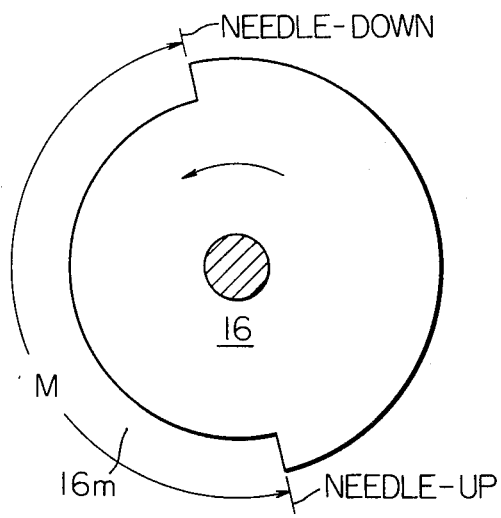
FIG. 10 is a view in elevation of a further modified form of the disc.
Figure 11:
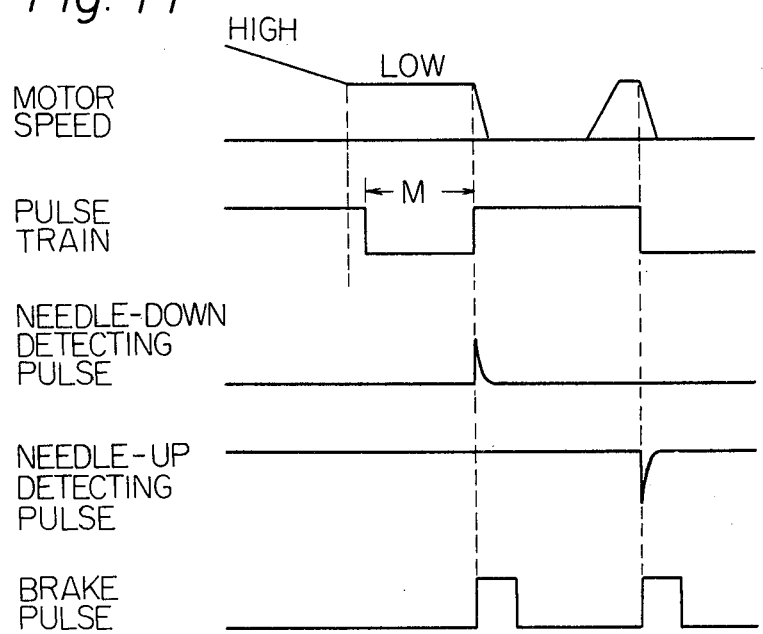
FIG. 11 is a graphical representation of the timerelated waveforms and operating conditions of the circuit elements used in the circuit of FIG. 12 in conjunction with the disc of FIG. 10.
Figure 12:
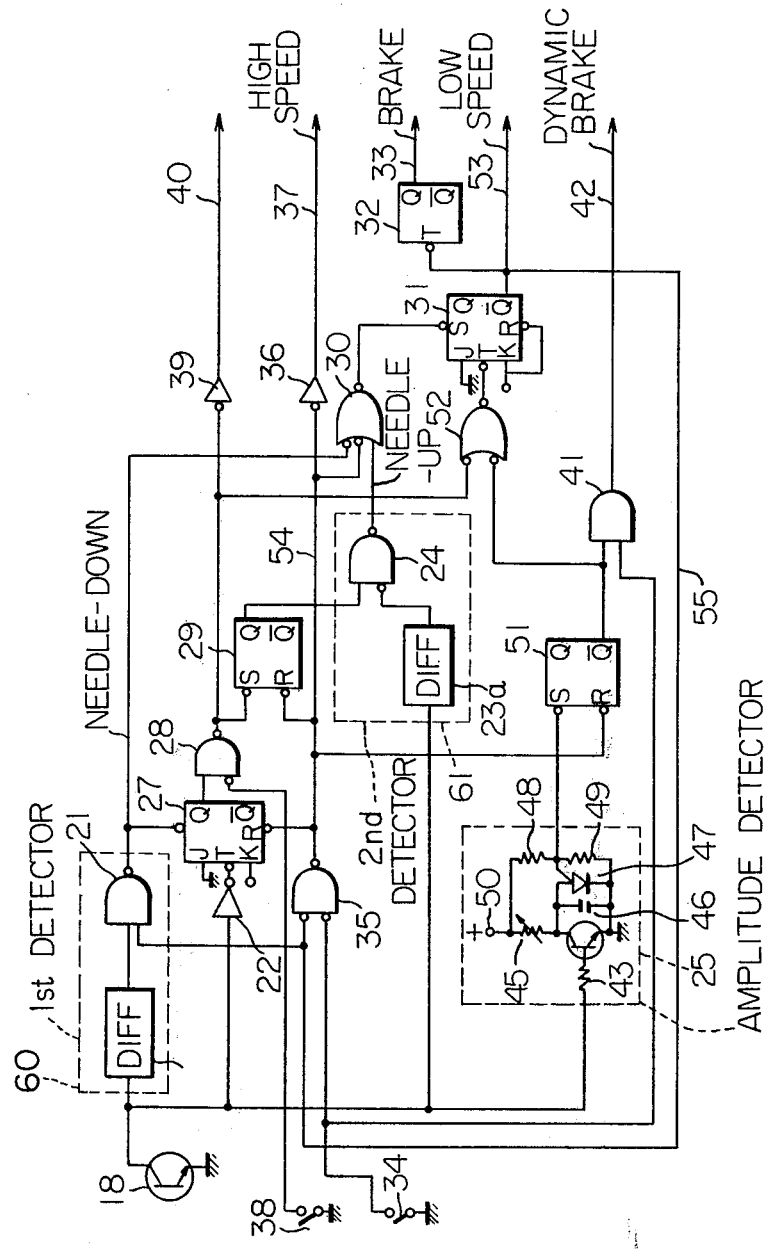
FIG. 12 is a schematic circuit diagram of the system of the invention used in conjunction with the disc of FIG. 10.

A further modification of the disc 16 is shown in FIG. 10, in which the disc 16 comprises a cutaway section 16m defining an arc M which substantially bisectors the circumference of the disc. However, the arc M is dependent of the type of sewing machine to which the present invention is to be applied. A rectangular pulse will be produced per revolution of the disc 16 and applied to the first detector 60 of FIG. 12 which comprises a differentiator 20a and AND gate 21. The differentiator 20a produces a positive sharp pulse at the leading edge of the applied rectangular pulse. The second pulse detector 61 is similar to detector 61 and comprises a differentiator 23a and AND gate 24. The differentiator 23a produces a negative sharp pulse at the trailing edge of the rectangular pulse. The negative pulse is applied as a low level signal to the inverting input of AND gate 24. It is understood that if the leading and trailing edges of the pulse are arranged such that they correspond to the lower and upper dead points of the needle, the positive and negative sharp pulses can be utilized as a needle-down detecting pulse and a needle-up detecting pulse, respectively, as shown in FIGS. 11c and 11d.

While the previous description has been concerned primarily with the detection of pulseless period of pulses it is to be understood that the pulseless period is in complementary relation to the pulse length. When a pulse of a given pulse length is inverted as is frequently done in the logic circuit, the pulse length exactly corresponds to the complementary pulseless period. Therefore, the foregoing description may also be applied to the detection of pulse length, and the pulseless period is equivalently used for pulse length.

By employment of a single speed sensing and needle positioning disc of the present invention having a plurality of cutaway sections at the periphery thereof to produce pulses with different pulseless periods or pulse lengths corresponding the needle-down and needle-up position and employment of respective pulse detectors, it is seen that the circuit configuration has considerably been simplified with the resulting economy for a sewing machine of the industrial type.

The foregoing description shows only a preferred embodiment of the present invention. Various modifications are apparent to those skilled in the art without departing from the scope of the present invention which is only limited by the appended claims. Therefore, the embodiment shown and described are only illustrative, not restrictive.

What is claimed is:

1. A needle position detector for a sewing maching having a motor drivable at high and low speeds, a needle armshaft adapted to be driven selectively by said motor to cause the needle to move reciprocally between upper and lower dead points, comprising in combination:

a light source and a circuit including a single photoelectrical device disposed in opposed relation to said light source to receive a light beam therefrom;

a disc coaxially connected to said needle armshaft for rotation therewith in synchronism with the reciprocal movement of said needle;

said disc being disposed between said photoelectrical device and said light source and having cutaway portions permitting passage of said light beam from said light source to said photoelectrical device and intervening portions interrupting said light beam, with transition portions between said cutaway portions and said intervening portions passing between said light source and said photoelectrical device as said disc rotates to produce electrical signals in said circuit, said transition portions comprising a first transition portion disposed in predetermined angular relationship to said needle armshaft corresponding to the lower dead point to produce a first signal and an angularly spaced second transition portion disposed in predetermined angular relation to said needle armshaft corresponding to the upper dead point to produce a second signal;

first brake means for decelerating said motor to said low speed;

a needle-down switch for energizing said first brake means;

speed sensing means for detecting when said motor has decelerated to said low speed to deenergize said first brake means;

a needle-down position detector coupled to said speed sensing means and to said photoelectrical device to produce a needle-down position signal in response to said first signal;

second brake means responsive to said needle-down position signal for decelerating said motor to a standstill with the needle at the lower dead point;

memory means coupled to said needle-down position detector to receive said needle-down position signal;

a needle-up switch for operating said motor at said low speed; and a needle-up position detector coupled to said needle-up switch, said memory means and said photoelectrical device to produce a needle-up position signal in response to said second signal;

said second brake means being receptive of said needle-up position signal to decelerate said motor to a standstill with the needle at said upper dead point.

2. A needle position detector as claimed in claim 1, wherein said first transition portion comprises a pair of teeth angularly spaced apart at a first spacing and said second transition portion comprises a pair of teeth angularly spaced apart at a second spacing greater than said first spacing.

3. A needle position detector as claimed in claim 2, wherein said first and second toothed sections are disposed diametrically opposite one another on said disc.

4. A needle position detector as claimed in claim 3, wherein said disc includes a pair of additional toothed sections located in diametrically opposed relation to each other and equally spaced from said first and second toothed sections.

5. A needle position detector as claimed in claim 2, wherein said needle-down position detector comprises a first monostable multivibrator coupled to said photoelectrical device and a first AND gate coupled to said first multivibrator and enabled by the operation of said needle-down switch, said first monostable multivibrator being arranged to produce a first pulse having a duration greater than the interval between pulses generated from said device in response to said first pair of teeth and smaller than the interval between pulses generated in response to said second pair of teeth, said first AND gate being receptive of said first pulse and having one input thereof connected to the input to said first monostable multivibrator, and wherein said needle-up position detector comprises a second monostable multivibrator connected to said photoelectrical device and a second AND gate coupled to said second multivibrator, said second multivibrator being arranged to produce a second pulse having a duration greater than the interval between pulses generated from said device in response to said second pair of teeth, said second AND gate being receptive of said second pulse and having one input thereof connected to the input of said second monostable multivibrator and said memory means.

6. A needle position detector as claimed in claim 1, wherein said second transition portion is angularly displaced from a point located in diametrically opposed relation to the first transition portion.

7. A needle position detector as claimed in claim 6, wherein said needle-down position detector comprises a monostable multivibrator connected to said photoelectrical device and a first AND gate coupled to said monostable multivibrator and enabled by the operation of said needle-down switch, said multivibrator being arranged to produce a pulse having a duration greater than the shorter one of interals between pulses generated from said device in response to said first and second transition portions and smaller than the longer one of said intervals, said first AND gate being receptive of said pulse and having one input coupled to the input to said monostable multivibrator, and wherein said needle-up position detector comprises a differentiator connected to said photoelectrical device and a second AND gate connected to said differentiator, said second AND gate being receptive of the differentiated pulse and further connected to said memory means.

8. A needle position detector as claimed in claim 1, wherein said first transition portion defines an edge of a tooth on said disc and said second transition portion defines the other edge of said tooth.

9. A needle position detector as claimed in claim 8, wherein said needle-down position detector comprises a first differentiator connected to said photoelectrical device and a first AND gate connected to said first multivibrator and enabled by the operation of said needle-down switch, and wherein said needle-up position detector comprises a second differentiator connected to said photoelectrical device, means for inverting the polarity of the output of said second differentiator, and a second AND gate connected to said inverting means and said memory means.

* * * * *